United States Patent
Eagle et al.

(10) Patent No.: US 9,781,276 B1
(45) Date of Patent: Oct. 3, 2017

(54) RELIABLY COMMUNICATING INFORMATION ASSOCIATED WITH MOBILE DEVICE ACCOUNTS

(71) Applicant: Jana Mobile, Inc., Boston, MA (US)

(72) Inventors: Nathan N. Eagle, Boston, MA (US); Craig A. Lancaster, Mansfield, MA (US); Julien Collard-Seguin, Dorchester, MA (US); Andrew R. Herbst, Cambridge, MA (US); Christopher S. Lee, Cambridge, MA (US)

(73) Assignee: Jana Mobile, Inc., Boston, MA (US)

( * ) Notice: Subject to any disclaimer, the term of this patent is extended or adjusted under 35 U.S.C. 154(b) by 0 days.

(21) Appl. No.: 15/496,151

(22) Filed: Apr. 25, 2017

(51) Int. Cl.
| | |
|---|---|
| *G06F 15/16* | (2006.01) |
| *H04M 15/00* | (2006.01) |
| *H04W 4/24* | (2009.01) |
| *H04W 24/08* | (2009.01) |

(52) U.S. Cl.
CPC .......... *H04M 15/735* (2013.01); *H04W 4/24* (2013.01); *H04W 24/08* (2013.01)

(58) Field of Classification Search
CPC ..... H04W 72/14; H04W 72/04; H04W 40/22; H04W 72/02
USPC ........ 455/406, 450, 451, 527; 370/225, 242, 370/401
See application file for complete search history.

(56) References Cited

U.S. PATENT DOCUMENTS

| | | |
|---|---|---|
| 2002/0062249 A1 | 5/2002 | Iannacci |
| 2011/0299408 A1 | 12/2011 | Gunawardena |
| 2012/0158412 A1 | 6/2012 | Dorai |
| 2012/0314864 A1 | 12/2012 | Ramprasad et al. |
| 2013/0083679 A1* | 4/2013 | Krishnaswamy ...... G08G 1/093 370/252 |
| 2014/0038545 A1 | 2/2014 | Ramprasad et al. |
| 2016/0055583 A1 | 2/2016 | Liberty et al. |
| 2017/0103413 A1 | 4/2017 | He et al. |

* cited by examiner

*Primary Examiner* — Sam Bhattacharya
(74) *Attorney, Agent, or Firm* — David H. Judson

(57) ABSTRACT

A computing platform enables the reliable delivery of message data (e.g., virtual airtime credits) into the accounts of mobile device users. The computing platform facilitates a large network of integrations (communication channels) with mobile network operators and reseller, preferably via a statistically-based message routing technique that uses a continuously updated estimate of the probability that a particular request over each integration will succeed. Requests are then routed over an integration picked using this information; if the request fails, the attempt is then retried using another integration until either it succeeds or the system believes the request will never succeed. The success or failure of each request is also used to update the probability estimate, preferably continuously, so that the system adjusts automatically as the reliability of each integration changes over time.

20 Claims, 2 Drawing Sheets

RELIABLY COMMUNICATING INFORMATION ASSOCIATED WITH MOBILE DEVICE ACCOUNTS

BACKGROUND

Technical Field

This application relates generally to electronic messaging and commerce involving mobile devices.

Brief Description of the Related Art

Mobile devices, such as a smartphone or tablet (e.g., Android OS-based devices, Apple iPhone®, etc.), have become ubiquitous in today's society. Faster processors, more memory, higher quality gesture-based multi-touch screens, availability of mobile broadband data, and integration of multi-media and GPS chips along with open interface mobile operating systems have opened the door for creation of a large variety of mobile applications.

Typically, mobile subscribers are on pay-as-you-go mobile plans. This is especially common in emerging markets. In such scenarios, it is known to provide mobile device users with free, unrestricted access to online content via a dedicated mobile device browser or mobile app that is ad-sponsored. In this model, end users (consumers) download and use the mobile app for free. As users visit sites, watch videos, test third party apps or search, they accumulate credits that can be exchanged, for example, for mobile airtime. That credit can then be associated with the end user's mobile device subscriber account.

While this approach is advantageous for mobile device end users, it is difficult to implement in practice. In particular, ensuring that a given account can be credited quickly at any given time turns out to be surprisingly difficult, especially in emerging markets, in part because of the technical complexities of reliably integrating with mobile network operators (and other providers of mobile device access services).

The technique of this disclosure addresses this issue.

BRIEF SUMMARY

This disclosure describes a method and computing platform to reliably transfer given data into accounts associated with mobile device users. In one embodiment, the method begins by establishing and maintaining communication channels with the one or more service entities. The service entities may be mobile network operators (MNOs), resellers or other vendors of mobile network access or related services. Mobile device end users are subscribers to mobile services and, as such, a particular mobile device end user typically has a subscriber account associated with a particular MNO or other entity. A service provider entity distinct from the service entities operates the computing platform that is integrated with the service entities. A particular service entity thus has an integration with the platform, and this integration provides a mechanism for enabling the service provider entity to interact with the service entity, e.g., on behalf of the mobile device end user. The mechanism may be implemented as an application programming interface (API) to provide, among other functions, a communication channel by which the service provider entity (via the platform) communicates messages or other data to the service entity. According to this disclosure, the service provider entity receives requests associated with the mobile devices. In one embodiment, the request is a request to transfer an accrued amount of virtual airtime (e.g., that the mobile device end user has obtained by virtue of undertaking various tasks or operations from the mobile device) into actual airtime (e.g., to increase an airtime limit that the device otherwise enjoys).

In response to receipt of each such request associated with a mobile device, the computing platform carries out a set of operations. These operations begin by retrieving (a) a list of the set of service entities then available to service the request, and (b) for each service entity in the list, a reliability score representing a reliability of the communication channel associated with the service entity with respect to transfer over a given time period of one or more prior data messages. A statistical method, e.g., a multi-arm bandit algorithm, is then applied to the list and the reliability scores to generate, for the request, a ranked order of one or more communication channels to use to respond to the request. The computing platform then generates a data message and, using the ranked order, attempts to deliver the data message to the one or more service entities via the one or more communication channels and according to the ranked order.

Advantageously, the computing platform enables the reliable delivery of message data (e.g., virtual airtime credits) into subscriber accounts associated with mobile device users. The computing platform overcomes the limitations of the prior art by combining a large network of integrations (communication channels) with operators and resellers, with a continuously-updated estimate of the probability that a particular request over each integration will succeed. Credit requests are then routed over an integration picked using this information; if the request fails, the attempt is then retried using another integration until either it succeeds or the system believes the request will never succeed. The success or failure of each request is also used to update the probability estimate, preferably continuously, so that the system adjusts automatically as the reliability of each integration changes over time.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

The disclosed method may be practiced in association with a computing infrastructure comprising one or more data processing machines.

Figure 1:
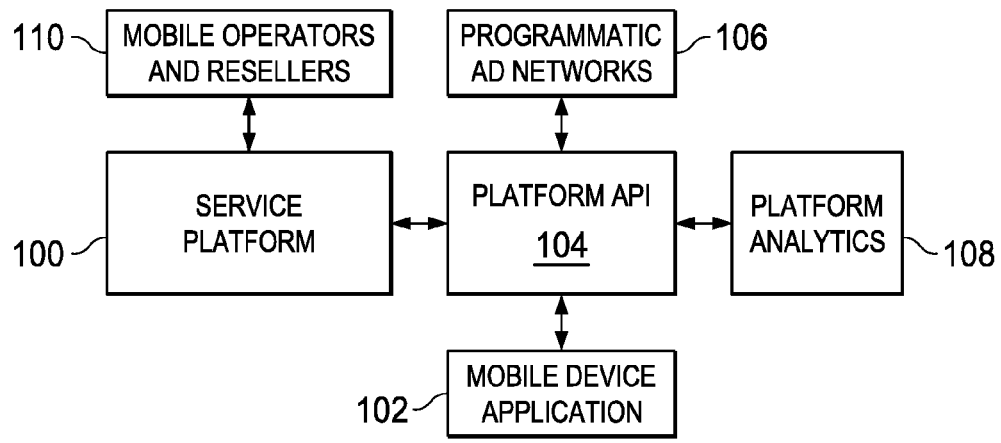
FIG. 1 is an implementation environment in which the techniques of this disclosed may be practiced.

FIG. 1 depicts a typical implementation environment. A service provider entity operates a computing platform 100 of this disclosure. Mobile device users execute a mobile device application (e.g., mCent™ for Android) 102 on their mobile devices. An alternative to the mobile device app may be a browser that implements a similar type of model by which the mobile device user can earn "credits" for taking given actions via the browser. The mobile device app or browser, which typically is provided by the service provider entity, is integrated with the computing platform 100 via an application programming interface (API) 104, which also provides an integration with one or more programmatic-based advertising networks 106. These networks provide advertisements or other branded content to the mobile device app or browser. The mobile device end user activities with respect to that content generate usage data that is logged and analyzed by an analytics sub-system 108 associated with the computing platform. As also depicted, the computing platform 100 is associated with a set of mobile network operators, resellers and other vendors, who are depicted generally at 110. Mobile network operators (MNOs) provide mobile access and related services to the mobile device end users who are subscribed to the mobile networks that are operated by those operators. Resellers and vendors refer to third party entities that resell the services of the MNOs. In this example embodiment, the service provider entity that owns, operates and manages the computing platform has business relationships and technical integrations with the mobile operators, resellers and other vendors 110 instead of the mobile device end users directly.

The mobile device end users (who download and run the app 102) are referred to herein as mobile device subscribers; typically, these users are on pay-as-you-go mobile plans provided by the mobile network operators. Thus, a particular mobile device end user is presumed to have a subscriber account with a particular MNO or reseller/vendor who provided the mobile service. This type of usage scenario is especially common in emerging markets. In such scenarios, and as described above, it is known to provide mobile device users with free, unrestricted access to online content via the mobile app or browser-based ad-delivery model that is facilitated by the app 102 and the programmatic ad networks 106. In this model, the mobile device end users download and use the mobile app/browser 102 for free. As a particular mobile device end user takes various actions, e.g., visiting sites, watching videos, testing third party apps, searching, etc., he or she accumulates data credits that can be exchanged, for example, for mobile airtime. That credit can then be associated with the end user's mobile device subscriber account. The computing platform provides this functionality, as is now described.

Figure 2:
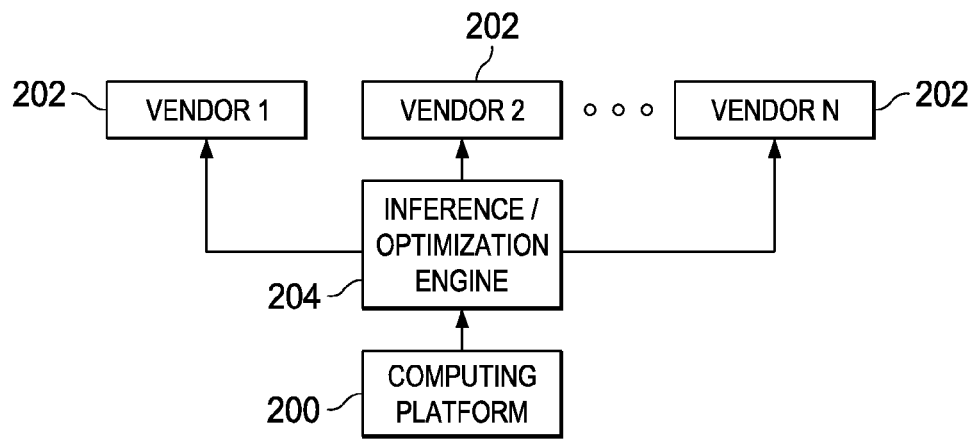
FIG. 2 depicts how a service provider platform links to a set of service entities (vendors) via an inference/optimization engine according to this disclosure.

In particular, and with reference now to FIG. 2, the computing platform 200 is coupled with a set of partners 202 (e.g., MNOs, resellers, other vendors) that provide (or facilitate providing of) mobile network access services (namely, "airtime"). The computing platform 200 is integrated with each partner 202 via an integration, typically some form of API that is published or otherwise provided (from the individual partner) to the service provider entity that operates the computing platform. The API associated with each partner may vary significantly, and typically the service provider implements these computing platform integrations across multiple networks, and often across multiple diverse geographic regions. This is especially so in emerging markets, although the techniques of this disclosure are not intended to be limited to any particular operating environment (whether geographical or otherwise). In a typical implementation, however, the differences (often significant) among the various partner integrations with the computing platform means makes ensuring that a given mobile device end user account can be credited quickly at any given time is very difficult. To address this technical challenge, the computing platform 200 executes an inference/optimization engine 204. The engine may be executed externally to the platform.

As used herein, a "partner" may be generalized as a "service entity."

As will be described, the inference/optimization engine 204 provides a continuously-updated estimate of the probability that a particular request (delivered from the platform 200) over each integration will succeed. Credit requests are then routed over an integration picked (by the engine 204) using this information; if the request fails, the attempt is then retried using another integration until either it succeeds or the system believes the request will never succeed. The success or failure of each request is also used to update the probability estimate, preferably continuously, so that the system adjusts automatically as the reliability of each integration changes over time.

Figure 3:
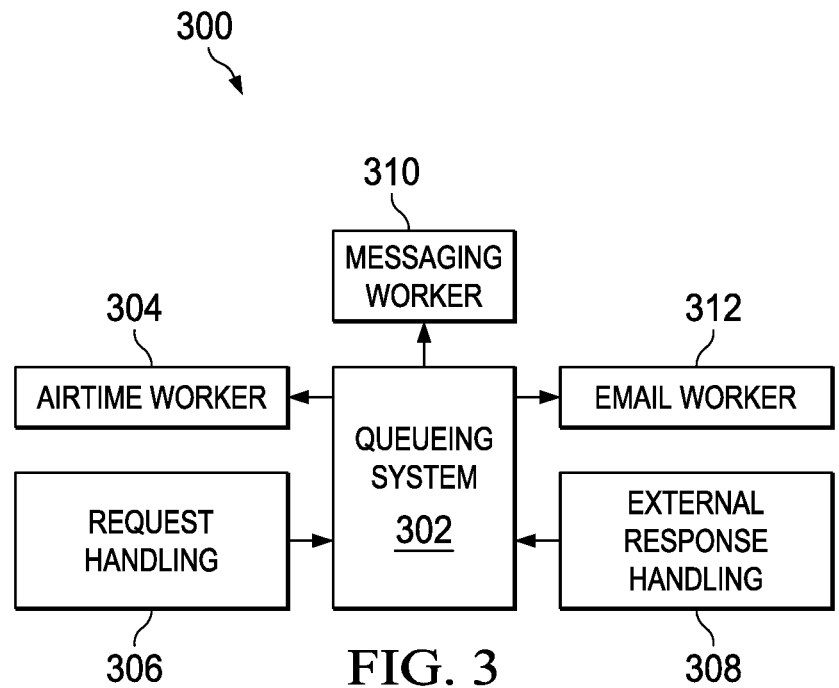
FIG. 3 depicts a representative architecture for the service provider optimization engine of this disclosure.

FIG. 3 depicts a preferred architecture of the inference/optimization engine 300. The engine comprises a number of components that are identified separately for identification purposes only; one or more of these components may be combined or otherwise integrated, co-located, or otherwise supported across one or more computing machines.

As depicted, the engine comprises a queueing system 302 such as redis, which is an open source in-memory data structure store used as a database, cache, and message broker, and a set of airtime worker threads/instances 304. Preferably, there is an airtime worker 304 for each vendor integration with a MNO, reseller or other vendor associated with the computing platform engine 300. As will be described in more detail below, each airtime worker 304 runs a task execution framework, together with logic that is used by the worker to select an ordered set of partners (MNOs, resellers or other vendors) that, based on their historical reliability, should be used by the engine to attempt to deliver a subscriber account update data message (e.g., a response to a request to transfer virtual airtime into the subscriber's account as actual airtime). The logic also tracks success and failure. Each worker executes separately and concurrently, and preferably each worker executes a statistical-based algorithm, such as a multi-armed bandit algorithm. Preferably, the algorithm is a Bayesian bandit variant wherein a beta probability distribution is constructed for each communication channel (represented by an integration between the platform and the computing infrastructure of a given MNO, reseller, or vendor); as the engine executes, this distribution is updated with information about the successes or failures of prior message deliveries over the communication channel(s). Further details of the algorithm execution are provided below.

As also depicted, the engine 300 comprises several supporting components. These include a request handling component 306 that receives requests associated with the end user mobile devices. These may be the requests themselves, or requests that are generated as a result of end users taking actions at the mobile devices, e.g., to transfer or convert virtual airtime credit into actual airtime associated with a mobile device subscriber account. The requests may be received one at a time, or in batch. Typically, the request handling component receives requests and passes them into the queueing system 302 for handling by the workers 304. An external response handling component 308 interacts with the partner(s), typically via a web-based request-response mechanism, to gather or otherwise receive success or failure information. In this manner, a particular communication channel (partner integration) may report back (or be queried to report back) to the engine regarding whether a particular message sought to be delivered over the channel reached its destination. The success and failure information collected by the external response handling component 308 is also provided to the queueing system 302 and workers 304 to update each bandit algorithm probability distribution. The messaging worker 310 and email worker 312 handle sending SMS and email for the platform. Although not depicted, a computing platform may include one or more other infrastructure components, e.g., a proxy server, a load balancer, a firewall, and the like.

As noted above, preferably each airtime worker thread executes an instance of a statistical algorithm, such as the multi-bandit. In probability theory, the multi-armed bandit problem (sometimes called the K or N-armed bandit problem) is a problem in which a gambler at a row of slot machines (sometimes known as "one-armed bandits") has to decide which machines to play, how many times to play each machine and in which order to play them. When played, each machine provides a random reward from a probability distribution specific to that machine. The objective of the gambler is to maximize the sum of rewards earned through a sequence of lever pulls. According to a preferred embodiment here, the multi-bandit technique is re-purposed and applied to maximize the likelihood that data messages (e.g., that apply credits to end user mobile device accounts) actually reach their intended targets. To this end, the computing platform maintains a database that stores, for each of the service entities, a "reliability score." The reliability score represents a reliability (typically expressed as a percentage) of the communication channel (the partner integration) with respect to prior requests that have been received and serviced by the computing platform with respect to that communication channel. In order words, the reliability score typically represents how well the communication channel did in transferring the data message(s) over a given time period. The time period may be varied, but typically is on the order of days or weeks.

Now, assume that the computing platform (the "service") receives a new request for handling. As noted above, the request may be received from the mobile device directly or indirectly, and the request need not be generated by the mobile device directly. The computing platform of course receives a large number of requests, as it is assumed that there is a very large number of mobile device end users being serviced. As requests are received by the request handling mechanism 306, they are passed to the queueing system 302 and then picked up for service by the airtime workers 304. The following describes the operation of an airtime worker 304 with respect to a particular request.

Figure 4:
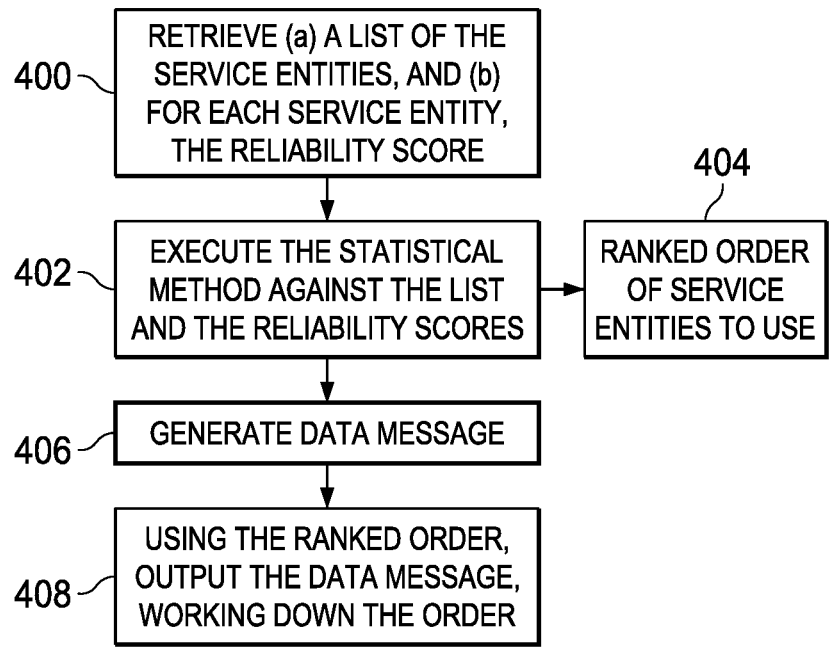
FIG. 4 depicts a process flow of an airtime worker according to an embodiment of this disclosure.

In particular, and with reference to the process flow shown in FIG. 4, at step 400 the airtime worker retrieves (from a data source, such as the database) (a) a list of the set of service entities then available to service the request, and (b) for each service entity in the list, the service entity's reliability score. At step 402, the airtime worker then executes the multi-bandit algorithm against the list and the reliability scores. This computation results in a ranked order 404 of one or more communication channels (service entities) to use to respond to the request. At step 406, the platform then generates an appropriate data message, and the content of the data message typically depends on the request. Thus, if the request is a request to transfer virtual airtime credit into account airtime, the data message includes an instruction to that effect, together with an amount of the credit. Then, and using the ranked order, at step 408 the worker outputs the data message generated, starting with the first communication channel in the ranking and then working down the order as necessary. In this manner, the computing platform attempts to deliver the data message to the one or more service entities via the one or more communication channels and according to the ranked order. The response handling component verifies or attempts to verify the delivery of the data message (and by which particular communication channel).

The above-described operation is repeated for each request received by the platform. The airtime workers operate asynchronously to one another, each executing its own individual instance of the multi-bandit algorithm. By executing the algorithm in this manner, the probability distribution of each connection option then available to the platform is discovered and thus made available for use to influence the message delivery (by way of the ranked orders). Collectively, these workers provide for an improved data message generation and delivery platform that provides enhanced reliability, availability and scalability as compared to prior art brute force delivery techniques.

As noted, in one particular use case, the computing platform enables the reliable delivery of message data (e.g., virtual airtime credits) into subscriber accounts associated with mobile device users. Using the multi-bandit algorithm instances executing asynchronously in the manner described, the computing platform overcomes the limitations of the prior art by combining the (potentially very large number of) communication channels, with a continuously-updated estimate of the probability that a particular request over each communication channel will succeed. An individual credit request is then routed over an integration picked using this information; if the request fails, the attempt is then retried using another integration until either it succeeds or the system believes the request will never succeed. Using the information collected by the response handling component (or otherwise by the platform), the success or failure of each request is also used to update the probability estimate, preferably continuously, so that the system adjusts automatically as the reliability of each integration changes over time.

The process carried out by the airtime worker instances may be varied based on one or more events or factors. Thus, for example, the bandit algorithm computation may be overridden (or not carried out) with respect to a particular partner (communication channel). The bandit algorithm computation may be weighted based on factors such as time-of-day, the source of the request, or the like. The reliability scores may be updated based on particular delivery attempts but not all attempts; in a preferred embodiment, only the success or failure of the "first" communication channel on a given ranked ordering is used to update the reliability score, while others are not used. In another variant, the computing platform (or a particular airtime worker) may implement a rate limit on requests to a particular service entity, and these rate limits may be applied to prune the list of service entities prior to applying the multi-bandit algorithm. A further variant takes into consideration whether a particular communication channel is active; this can be determined by periodic checks of whether test messages (e.g., ICMP pings, object requests, or the like) result in detected responses.

While the computing platform provides a significant advantage in reliably moving credit into mobile device end user prepaid mobile accounts, this is not a limitation. The computing platform can be used for other message generation and delivery applications, irrespective of the particular content that is the subject of any particular data message.

Enabling Technologies

One or more functions of the computing platform of this disclosure may be implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

Typically, but without limitation, a client device is a mobile device, such as a smartphone, tablet, or wearable computing device. Such a device comprises a CPU (central processing unit), computer memory, such as RAM, and a drive. The device software includes an operating system (e.g., Google® Android™, or the like), and generic support applications and utilities. The device may also include a graphics processing unit (GPU). The mobile device also includes a touch-sensing device or interface configured to receive input from a user's touch and to send this information to processor. The touch-sensing device typically is a touch screen. The mobile device comprises suitable programming to facilitate gesture-based control, in a manner that is known in the art.

Generalizing, the mobile device is any wireless client device, e.g., a cellphone, pager, a personal digital assistant (PDA, e.g., with GPRS NIC), a mobile computer with a smartphone client, or the like. Other mobile devices in which the technique may be practiced include any access protocol-enabled device (e.g., an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

In a representative embodiment, the mobile device is a cellular telephone that operates over GPRS (General Packet Radio Service), which is a data technology for GSM networks. In addition to a conventional voice communication, a given mobile device can communicate with another such device via many different types of message transfer techniques, including SMS (short message service), enhanced SMS (EMS), multi-media message (MMS), email, WAP, paging, or other known or later-developed wireless data formats. Generalizing, a mobile device as used herein is a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

The underlying network transport may be any communication medium including, without limitation, cellular, wireless, Wi-Fi, small cell (e.g., femto), and combinations thereof.

Each above-described process preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

The functionality may be implemented with other application layer protocols besides HTTP/HTTPS, or any other protocol having similar operating characteristics.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

What is claimed is as follows:

1. A computing platform associated with a set of service entities, the service entities being distinct from an entity that operates the computing platform, the computing platform comprising:
   at least one hardware processor;
   computer memory holding computer program instructions executed by the hardware processor and configured to reliably transfer to the set of service entities data messages over a set of communication channels associated with the set of service entities, the computer program instructions comprising program code configured to:
      instantiate a set of one or more worker instances, wherein a worker instance is configured to establish and maintain a communication channel with a service entity;
      responsive to receipt of a request associated with a third party mobile device, the request being one of multiple requests received at the computing platform, associate the request with a particular worker instance of the set of worker instances;
      for each request associated with the particular worker instance, and at the particular worker instance:
         retrieve (a) a list of the set of service entities then available to service the request, and (b) for each service entity in the list, a reliability score representing a reliability of the communication channel associated with the service entity with respect to transfer of one or more prior data messages over the communication channel during a given time period;
         apply the list and the reliability scores through a statistical method to generate, for the request, a ranked order of one or more communication channels to use to respond to the request; and
         generate a data message and, using the ranked order, attempt to deliver the data message to the one or more service entities via the one or more communication channels and according to the ranked order.

2. The computing platform as described in claim 1, wherein the statistical method is a multi-arm bandit algorithm.

3. The computing platform as described in claim 1, wherein a service entity in the set of service entities is one of: a mobile network operator (MNO), and a vendor or reseller of mobile device services.

4. The computing platform as described in claim 1, wherein the data message is an instruction to apply a credit value to an account associated with a mobile device user.

5. The computing platform as described in claim 4, wherein the request is a request to convert a virtual data value into an actual data value, wherein the virtual data value represents an accrued amount of virtual airtime, and wherein the actual data value represents airtime credits associated with the mobile device user account.

6. The computing platform as described in claim 1, wherein the computer program instructions are further configured to filter the list of the set of service entities.

7. The computing platform as described in claim 6, wherein the list of the set of service entities is filtered to remove from the list any service entity that is over a predetermined rate limit associated with the service entity.

8. The computing platform as described in claim 1, wherein the reliability score is based only on success or failure data for a first attempt to deliver as identified in the ranked order.

9. The computing platform as described in claim 1, wherein the computer program instructions are further configured to update the reliability score following the attempt to deliver the data message.

10. The computing platform as described in claim 1, wherein the computer program instructions are further configured to override applying the statistical method upon a given condition.

11. The computing platform as described in claim 1, wherein at least first and second worker instances execute asynchronously to one another.

12. The computing platform as described in claim 1, wherein the computer program instructions are further configured to receive from a service entity a confirmation of whether an attempt to deliver the data message succeeds or fails.

13. The computing platform as described in claim 1, wherein each of first and second service entities interface to the computing platform over application programming interfaces (APIs) that differ from one another.

14. The computing platform as described in claim 1, wherein the computer program instructions are further configured to receive and queue requests from third party mobile devices.

15. The computing platform as described in claim 14, wherein the computer program instructions are further configured to instantiate additional worker instances as additional requests are received in the queue.

16. A method to reliably transfer given data into accounts associated with mobile device users, comprising:
   establishing and maintaining communication channels with the one or more service entities;
   responsive to receipt of a request associated with a mobile device, the request being one of multiple requests received:
      retrieving (a) a list of the set of service entities then available to service the request, and (b) for each service entity in the list, a reliability score representing a reliability of the communication channel associated with the service entity with respect to transfer of one or more prior data messages over the communication channel during a given time period;

applying the list and the reliability scores through a statistical method to generate, for the request, a ranked order of one or more communication channels to use to respond to the request; and generating a data message and, using the ranked order, attempt to deliver the data message to the one or more service entities via the one or more communication channels and according to the ranked order.

17. The method as described in claim 16, wherein the statistical method is a multi-arm bandit algorithm.

18. The method as described in claim 16, wherein a service entity in the set of service entities is one of: a mobile network operator (MNO), and a vendor or reseller of mobile device services.

19. The method as described in claim 16 wherein the data message is an instruction to apply a credit value to an account associated with the user of the mobile device.

20. The method as described in claim 19, wherein the request is a request to convert a virtual data value into an actual data value, wherein the virtual data value represents an accrued amount of virtual airtime, and wherein the actual data value represents airtime credits associated with the mobile device user account.

\* \* \* \* \*